(12) United States Patent
Ranford

(10) Patent No.: US 8,600,667 B2
(45) Date of Patent: Dec. 3, 2013

(54) LOCATION BASED ENTERTAINMENT WITH A PERSONAL NAVIGATION DEVICE

(75) Inventor: Paul Ranford, Auckland (NZ)

(73) Assignee: Mitac International Corp., Kuei-Shan Hsiang, Tao-Yuan Hsien (TW)

( * ) Notice: Subject to any disclaimer, the term of this patent is extended or adjusted under 35 U.S.C. 154(b) by 533 days.

(21) Appl. No.: 12/909,852

(22) Filed: Oct. 22, 2010

(65) Prior Publication Data

US 2012/0101724 A1    Apr. 26, 2012

(51) Int. Cl.
*G01C 21/34* (2006.01)
*G01C 21/00* (2006.01)

(52) U.S. Cl.
USPC .......................................... 701/439; 701/457

(58) Field of Classification Search
USPC ......... 701/411, 424, 427, 430, 438, 439, 448, 701/454, 457, 541; 340/905, 995.14, 340/995.17, 995.24
See application file for complete search history.

(56) References Cited

U.S. PATENT DOCUMENTS

| | | | |
|---|---|---|---|
| 5,648,768 A * | 7/1997 | Bouve | 340/988 |
| 6,085,148 A * | 7/2000 | Jamison et al. | 701/516 |
| 7,741,978 B2 * | 6/2010 | Becker | 340/995.24 |
| 8,279,090 B2 * | 10/2012 | Becker | 340/995.24 |
| 8,364,395 B2 * | 1/2013 | French et al. | 701/410 |
| 8,370,062 B1 * | 2/2013 | Starenky et al. | 701/467 |
| 8,401,771 B2 * | 3/2013 | Krumm et al. | 701/115 |
| 2002/0142759 A1 * | 10/2002 | Newell et al. | 455/414 |
| 2003/0144047 A1 * | 7/2003 | Sprogis | 463/9 |
| 2010/0214133 A1 * | 8/2010 | Becker | 340/988 |

* cited by examiner

*Primary Examiner* — Jason Holloway
(74) *Attorney, Agent, or Firm* — Winston Hsu; Scott Margo

(57) ABSTRACT

A method of providing location based entertainment with a personal navigation device includes determining if a user wishes to start an entertainment program on the personal navigation device that provides localized entertainment and starting the entertainment program using content about a current location of the personal navigation device in response to the user wishing to start the entertainment program.

20 Claims, 2 Drawing Sheets

LOCATION BASED ENTERTAINMENT WITH A PERSONAL NAVIGATION DEVICE

BACKGROUND OF THE INVENTION

1. Field of the Invention

The invention relates to an entertainment program on a personal navigation device, and more particularly, to a personal navigation device that provides location based entertainment according to a current location of the personal navigation device.

2. Description of the Prior Art

Global Positioning System (GPS) based navigation devices are well known and are widely employed as in-car navigation devices. Common functions of a navigation device include providing a map database for generating navigation instructions that are then shown on a display of the navigation device. These navigation devices are often mounted on or in the dashboard of a vehicle using a suction mount or other mounting means.

The term "navigation device" refers to a device that enables a user to navigate to a pre-defined destination. The device may have an internal system for receiving location data, such as a GPS receiver, or may merely be connectable to a receiver that can receive location data. The device may compute a route itself, or communicate with a remote server that computes the route and provides navigation information to the device, or a hybrid device in which the device itself and a remote server both play a role in the route computation process. Portable GPS navigation devices are not permanently integrated into a vehicle but instead are devices that can readily be mounted in or otherwise used inside a vehicle. Generally (but not necessarily), they are fully self-contained—i.e. include an internal GPS antenna, navigation software and maps and can hence plot and display a route to be taken.

When users are driving on a long journey or are driving late at night, it is common for drivers and passengers to feel bored. On long, straight stretches of road, it easy for the driver to get bored enough that the driver may start to fall asleep. Even if the driver is using a personal navigation device, there may be no immediate turns or other information that the personal navigation device needs to notify the driver about. Therefore, the driver may become increasingly bored and tired, which is extremely dangerous.

SUMMARY OF THE INVENTION

It is therefore one of the primary objectives of the claimed invention to provide entertainment to the driver and passengers of a vehicle using questions and facts pertaining to the location that the vehicle is currently driving through.

According to an exemplary embodiment of the claimed invention, a method of providing location based entertainment with a personal navigation device is disclosed. The method includes determining if a user wishes to start an entertainment program on the personal navigation device that provides localized entertainment and starting the entertainment program using content about a current location of the personal navigation device in response to the user wishing to start the entertainment program.

It is an advantage that the personal navigation device can generate entertainment content that is related to the current location or current area of the personal navigation device. In this way, the user of the personal navigation device is more engaged by the entertainment program and is less likely to fall asleep. In addition, the entertainment program provides a fun way to learn more information about the area that they are travelling through while also helping to pass the time on long trips.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
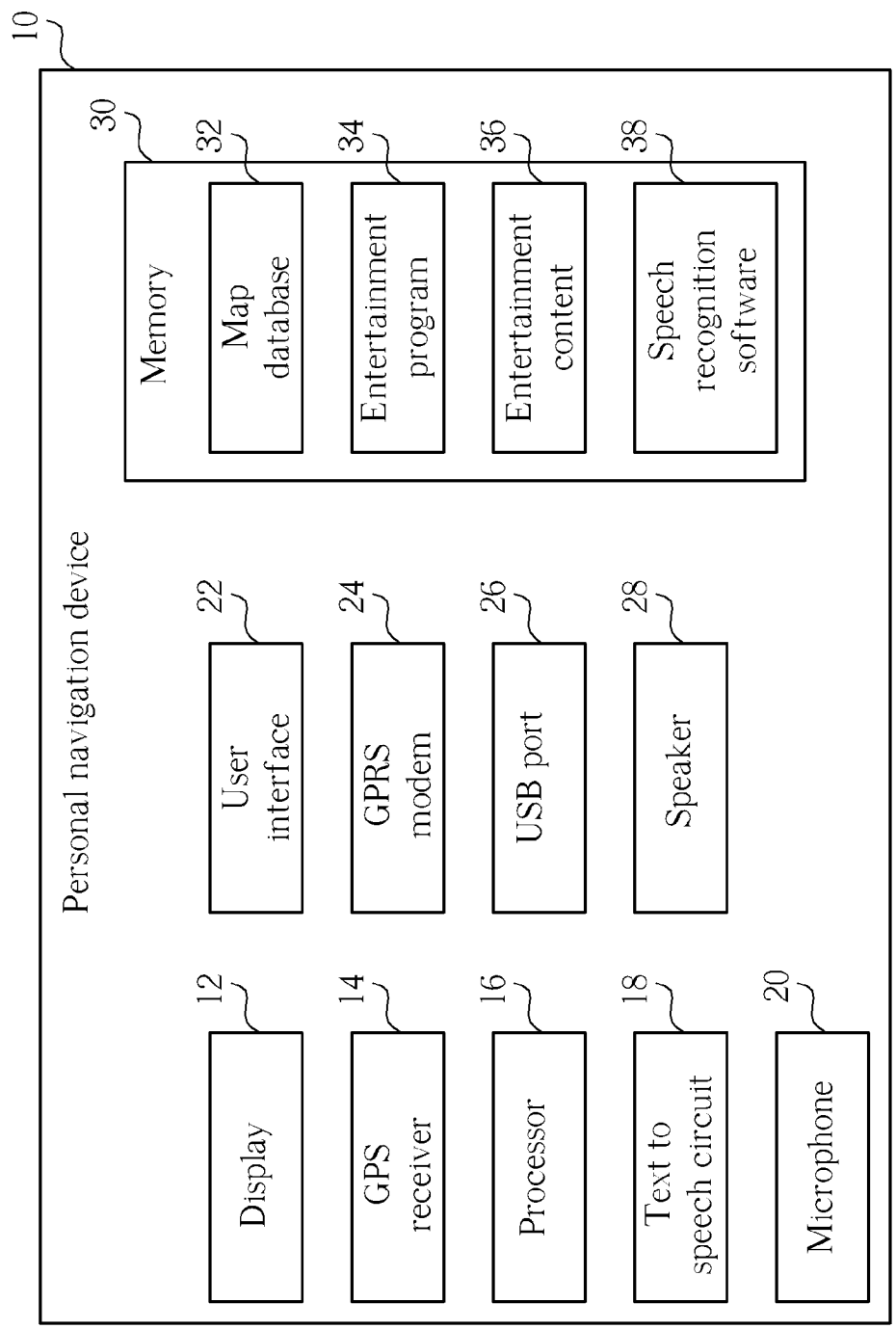
FIG. 1 is a block diagram of a personal navigation device according to the present invention.

Please refer to FIG. 1. FIG. 1 is a block diagram of a personal navigation device 10 according to the present invention. The personal navigation device 10 contains a display 12 which can be a touch sensitive display, a GPS receiver 14 for receiving the current coordinates of the personal navigation device 10, a processor 16 for controlling operation of the personal navigation device 10, a text to speech circuit 18 for converting text files into speech, a microphone 20 for receiving voice input from a user, a user interface 22, a General Packet Radio Service (GPRS) modem 24 for providing internet access, a Universal Serial Bus (USB) port 26 for allowing data to be exchanged with a computer, a speaker 28, and memory 30. The memory 30 is used to store a map database 32 containing map data and points of interest. The memory 30 also stores an entertainment program 34 as well as corresponding entertainment content 36. The entertainment program 34 is used to read questions or facts about the current location or current area of the personal navigation device 10 to the user. The memory 30 also contains speech recognition software 38 for recognizing answers that the user provides in response to questions asked by the entertainment program 34.

Figure 2:
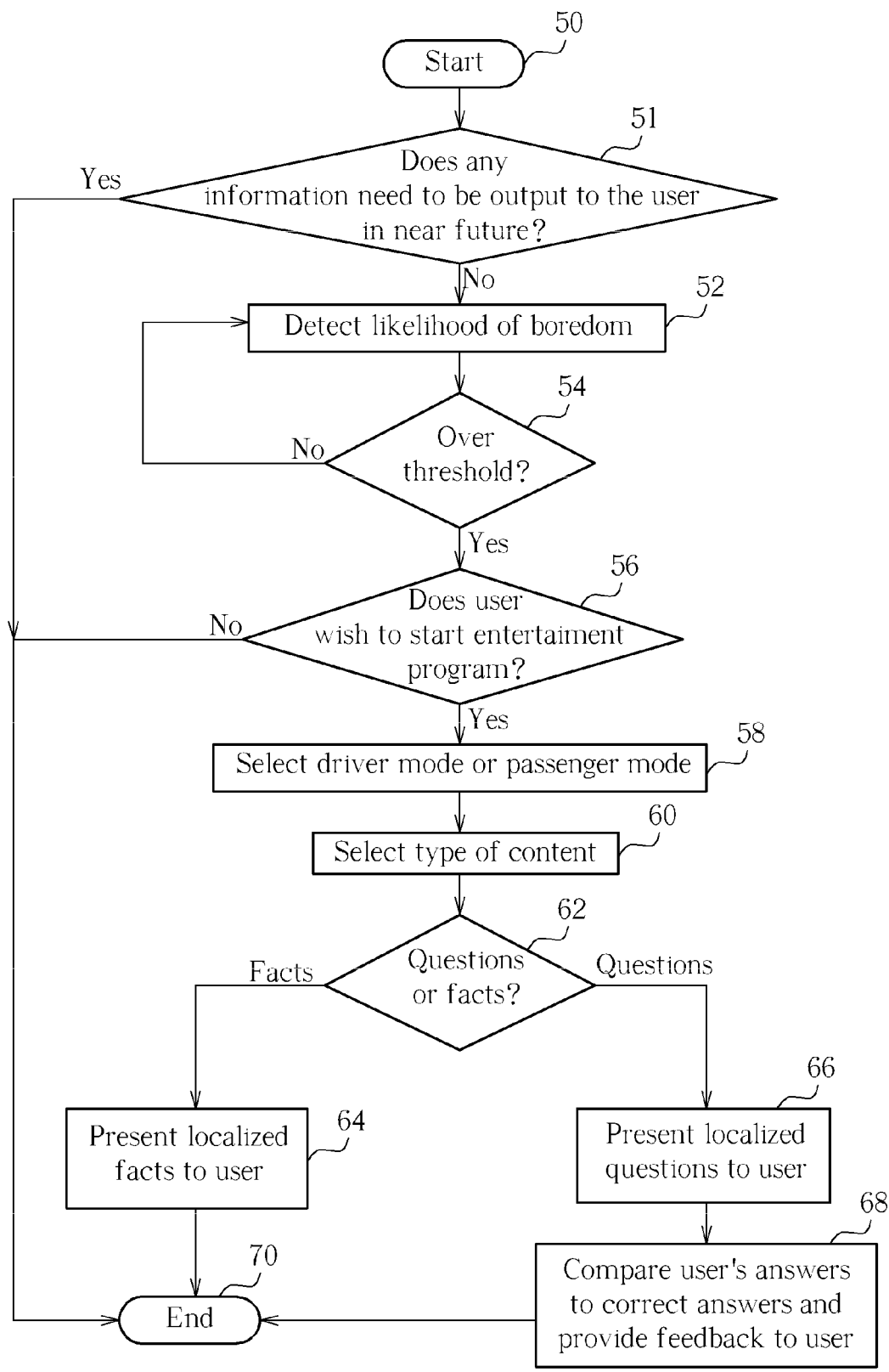
FIG. 2 is a flowchart illustrating a method of creating location based content with the personal navigation device according to the present invention.

Please refer to FIG. 2. FIG. 2 is a flowchart illustrating a method of creating location based content with the personal navigation device 10 according to the present invention. Steps contained in the flowchart will be explained below.

Step 50: Start.

Step 51: Determine if any navigation instructions or driving information needs to be output to the user within a following predetermined period of time. If so, go to step 70. If not, go to step 52.

For safety reasons, navigation instructions or driving-related information (like notifications regarding speed limits and speed cameras) should be prioritized first in the personal navigation device 10 instead of providing location based entertainment. Therefore, the personal navigation device 10 first checks to see if there are any navigation instructions or driving-related information scheduled to be output to the user in the near future, such as within the next five minutes. If there is nothing scheduled, then the method proceeds to the following step. However, if there is information that is scheduled to be output soon, then the method ends so that the location based entertainment will not be interrupted soon after it is started.

If it becomes necessary to provide the user with new information that was not previously predicted, the location based entertainment can still be interrupted, but the above check will help to minimize interruptions to the entertainment content.

Step 52: Detect the likelihood of boredom. The likelihood of boredom is a quantitative measure of the likely boredom level of the driver or the passengers in a vehicle in which the personal navigation device 10 is located. The likelihood of boredom can be calculated in a variety of different ways. For example, recent acceleration patterns of the vehicle can be considered. When there has been little acceleration recently, this might indicate that the road is straight and level, which would cause more boredom for the driver. Also, the total distance traveled on a trip or a period of time that the personal navigation device 10 has been in motion can also be considered. Similarly, the total distance traveled or a period of time since the last change in acceleration that is greater than a predetermined amount can also be considered. A significant change in acceleration means that the user is actively controlling the vehicle, and therefore, the user is less likely to suffer from boredom when active control is needed.

Other criteria that can be used for calculating the likelihood of boredom are the current time of day, or a period of time elapsed since a most recent stop lasting more than a predetermined time period, such as 3 minutes or 5 minutes. Activity level for the user of the device can also be considered when determining the likelihood of boredom. For instance, the level of voice activity in the vehicle can be detected by the microphone 20 of the personal navigation device 10. If the car is very silent and there is no speech detected from the driver or passengers, then there is more chance for boredom. Similarly, if the user has not used the user interface 22 within a set amount of time, this can also be taken as a sign of boredom. Another good indicator is any prompts issued to the user by the personal navigation device 10 that go unanswered by the user. It may be that the user is starting to fall asleep if the user is now answering any issued prompts.

Step 54: Determine if the likelihood of boredom is greater than a threshold level. If so, go to step 54. If not, go back to step 52.

Step 56: Determine if the user wishes to start the entertainment program 34. If so, go to step 58. If not, go to step 70.

Step 58: The user selects driver mode or passenger mode. The different modes are provided to change the way the user interacts with the entertainment program 34. In driver mode, the user ideally will not have to look at the display 12 of the personal navigation device 10 at all in order to participate with the entertainment program 34. Instead, the text to speech circuit 18 in conjunction with the speaker 28 can be used for reading out the questions that are stored as text files in the entertainment content 36 section of the memory 30. Likewise, the speech recognition software 38 can be used in conjunction with the microphone 20 to recognize the user's answers.

In passenger mode, the display 12 can be used more by the entertainment program 34 since passengers can focus on the display 12 instead of keeping their eyes on the road. In passenger mode, users can choose to hear the questions read to them by the text to speech circuit 18 or they can read the questions on the display 12. Also, the users can choose to have their spoken answers recognized by the speech recognition software 38 or they can indicate their answers through the user interface 22 or the display 12 if it is a touch sensitive display.

Step 60: The user selects the type of entertainment content 36 for the entertainment program 34 to utilize. The entertainment content 36 can be geographical or historical facts about the area, information about what the area is famous for, information about famous technology of the area, famous people from the area, famous disasters or incidents occurring in the area, and so on.

The user can also select whether the entertainment program 34 will read out facts about the area or if the entertainment program 34 will ask questions that need to be answered by the user. Questions can be in a variety of forms, such as true-false questions, multiple choice questions, short answer questions, and so on. An example multiple choice question can be, "Which of the following is true about this place?" followed by three or four different choices. If a user always prefers a certain type of entertainment content 36 and has a preference for simply hearing the facts read to him or for answering a certain type of question, these preferences can be saved as default settings in the entertainment program 34 so that the user can optionally skip step 60.

Step 62: Determine if the user prefers hearing or reading facts or if the user wishes to answer questions. If the user wishes to hear or read facts, go to step 64. If the user wishes to answer questions, go to step 66.

Step 64: The entertainment program 34 presents facts and trivia about the current location to the user by displaying the facts on the display 12 or by reading the facts out through the text to speech circuit 18 and the speaker 28 for entertaining the user. After enough facts have been presented, go to step 70.

Step 66: The entertainment program 34 asks the user questions about the current location by displaying the questions on the display 12 or by reading the questions out through the text to speech circuit 18 and the speaker 28. The user can indicate the answer through the user interface 22, the display 12, or by saying the answers into the microphone 20 and having the speech recognition software 38 recognize the answers.

Step 68: The entertainment program 34 compares the user's answers to the correct answers stored in the entertainment content 36 and gives feedback to the user as to whether the user's answer is correct or not. After enough questions have been presented, go to step 70.

Step 70: End.

The entertainment content 36 can be stored in memory before a trip starts. On the other hand, if the personal navigation device 10 is connected to the internet, such as through the GPRS modem 24, the entertainment content 36 can be downloaded dynamically from the internet when the personal navigation device 10 travels into new areas. When the personal navigation device 10 is sold, it may come provided with entertainment content 36 for all of areas that the map database 32 covers. Additionally, the personal navigation device 10 can utilize the USB port 26 or other similar port for transferring entertainment content 36 from a computer into the memory 30 of the personal navigation device 10. Another convenient way of obtaining the entertainment content 36 is by utilizing the GPRS modem 24 of the personal navigation device 10 for connecting to a server via the internet to download entertainment content 36 from the server. Other wireless communication standards can also be used instead of the GPRS modem 24, such as a wireless local area network (WLAN) transceiver.

In summary, the present invention method for providing location based entertainment can keep drivers awake, can entertain passengers and help keep children from fighting with each other, can help the users to pass the time more enjoyably, and can help the users to learn more about the area that they are driving through. The entertainment program can be activated by the user or can automatically detect situations in which there is a high likelihood of boredom, during which the user would benefit from some entertainment that is related to the user's current location.

Those skilled in the art will readily observe that numerous modifications and alterations of the device and method may be made while retaining the teachings of the invention.

What is claimed is:

1. A method of providing location based entertainment with a personal navigation device, the method comprising:

determining, with a processor of the personal navigation device, if a user wishes to start an entertainment program on the personal navigation device that provides localized entertainment, wherein determining if the user wishes to start the entertainment program comprises:

detecting, with the processor a likelihood of boredom by calculating statistics regarding recent movements that the personal navigation device has experienced, by calculating an amount of recent user interface activity, by calculating recent voice activity of the user, or by calculating a current time; and prompting the user to start the entertainment program when the likelihood of boredom is greater than a predetermined level; and starting, with the processor, the entertainment program using content about a current location of the personal navigation device in response to the user wishing to start the entertainment program.

2. The method of claim 1, wherein the entertainment program prompts the user to select a type of content used in the localized entertainment.

3. The method of claim 1, wherein the type of content used in the localized entertainment comprises true and false questions about facts pertaining to the current location of the personal navigation device, the user indicating an answer to each question through a voice reply or through a command through a user interface of the personal navigation device.

4. The method of claim 1, wherein the type of content used in the localized entertainment comprises multiple choice questions about facts pertaining to the current location of the personal navigation device, the user indicating an answer to each question through a voice reply or through a command through a user interface of the personal navigation device.

5. The method of claim 1, wherein the type of content used in the localized entertainment comprises short answer questions which require the user to say an answer, the short answer questions asking the user about facts pertaining to the current location of the personal navigation device.

6. The method of claim 1, wherein the type of content used in the localized entertainment comprises announcing facts and trivia about the current location of the personal navigation device to the user.

7. The method of claim 1, wherein the entertainment program is executed in driver mode or passenger mode, each mode having adjustable settings for presenting the questions in speech form or in text form and for accepting answers as a touch response or a spoken response.

8. The method of claim 1, wherein the personal navigation device comprises a text to speech (TTS) circuit for converting questions stored in text form into speech.

9. The method of claim 1, wherein the personal navigation device comprises speech recognition software for recognizing spoken responses given by the user.

10. The method of claim 1, wherein content about the current location of the personal navigation device is downloaded to a memory of the personal navigation device as the personal navigation device when the personal navigation device enters a new area.

11. The method of claim 1, wherein content about the current location of the personal navigation device is stored in a memory of the personal navigation device in advance and retrieved as the personal navigation device enters the current location.

12. The method of claim 1, wherein the likelihood of boredom is calculated according to recent acceleration patterns of a vehicle that the personal navigation device is located in.

13. The method of claim 1, wherein the likelihood of boredom is calculated according to a distance travelled or a period of time that the personal navigation device has been in transit.

14. The method of claim 1, wherein the likelihood of boredom is calculated according to a distance travelled or a period of time that the personal navigation device has been in transit without a predetermined change in acceleration of a vehicle that the personal navigation device is located in.

15. The method of claim 1, wherein the likelihood of boredom is calculated according to a current time of day.

16. The method of claim 1, wherein the likelihood of boredom is calculated according to a period of time elapsed since a most recent stop lasting more than a predetermined time period.

17. The method of claim 1, wherein the likelihood of boredom is calculated according to a level of voice activity detected by a microphone of the personal navigation device.

18. The method of claim 1, wherein the likelihood of boredom is calculated according to a level of activity from the user with a user interface of the personal navigation device.

19. The method of claim 1, wherein the likelihood of boredom is calculated according to a level of activity from the user in response to prompts issued by a user interface of the personal navigation device.

20. The method of claim 1 further comprising:

determining if the personal navigation device is scheduled to output any navigation instructions or driving information to the user within a following predetermined period of time; and proceeding to determine if the user wishes to start the entertainment program only when no navigation instructions or driving information is scheduled to be output to the user within the following predetermined period of time.

* * * * *